United States Patent [19]
Hengstebeck

[11] 3,969,450
[45] July 13, 1976

[54] HEAT-EXCHANGER TRAYS AND SYSTEM USING SAME

[75] Inventor: Robert J. Hengstebeck, Valparaiso, Ind.

[73] Assignee: Standard Oil Company, Chicago, Ill.

[22] Filed: Nov. 14, 1973

[21] Appl. No.: 415,524

[52] U.S. Cl. ............................. 261/153; 202/158; 261/161
[51] Int. Cl.² .......................... B01D 3/14; B01F 3/04
[58] Field of Search .......... 261/153, 156, 158, 161, 261/160, 148, 113, 114 R; 62/28, 34, 42, 40; 202/158

[56] References Cited
UNITED STATES PATENTS

| | | | |
|---|---|---|---|
| 731,799 | 6/1903 | Lummus | 261/148 X |
| 2,690,060 | 9/1954 | Legatski | 261/148 X |
| 2,912,377 | 11/1959 | Lehrian | 261/148 X |
| 3,016,234 | 1/1962 | Huppmeier | 261/98 |
| 3,168,600 | 2/1965 | Martin | 202/158 X |
| 3,319,428 | 5/1967 | Isaacson | 62/28 |
| 3,444,696 | 5/1969 | Geddes et al. | 62/28 |
| 3,625,017 | 12/1971 | Hoffman | 62/34 X |
| 3,792,842 | 2/1974 | Nakako et al. | 261/156 X |
| 3,792,843 | 2/1974 | Stage | 261/153 X |

FOREIGN PATENTS OR APPLICATIONS

| | | | |
|---|---|---|---|
| 459,415 | 1/1937 | United Kingdom | 261/156 |
| 118,848 | 9/1919 | United Kingdom | 261/158 |

*Primary Examiner*—Tim R. Miles
*Assistant Examiner*—Richard L. Chiesa
*Attorney, Agent, or Firm*—Claron N. White; Arthur G. Gilkes; William T. McClain

[57] ABSTRACT

A novel distillation tray useful as a horizontally disposed internal for a distillation column, especially a cryogenic distillation column, has a set of parallel horizontal pipes spaced from one another to support a pool of down-flowing liquid and to provide passage of up-flowing vapor through the spaces. At each end the pipes are connected to and communicate with a manifold. A number of these trays in a vertically tiered array are connected to one another as an assembly in the column. The assembly of the trays is provided by the manifolds at the two ends of the sets of pipes. In one construction the manifold for one set of pipes has an upward vertical extension that is also one manifold of the adjacent upper tray, while the other manifold for the first set of pipes has a downward vertical extension that is also one manifold of the adjacent lower tray. In another construction the manifold at one end of a set of pipes is connected to a pipe extending upwardly to the manifold of the adjacent upper tray, while the manifold at the other end is connected to the pipe that extends upwardly from the manifold at that end of the adjacent lower tray. The manifold of the lowermost tray that is not in communication with the manifold of the tray immediately above it is connected to a pipe extending through the wall of the column. The manifold of the uppermost tray of such assembly that is not in communication with a manifold of the tray below it is connected to a pipe extending through the column wall. Alternatively, that uppermost manifold has an opening to the chamber of the column so that fluid after passage through the assembly of trays is then introduced directly into the column as a feed for the column. As a second alternative, the set of pipes of the top tray of the assembly in the stripping section of a column can be short to feed the fluid to the chamber of the column. Columns containing the assembly of the trays in the stripping section and/or rectifying section are especially useful in novel distillation systems.

29 Claims, 11 Drawing Figures

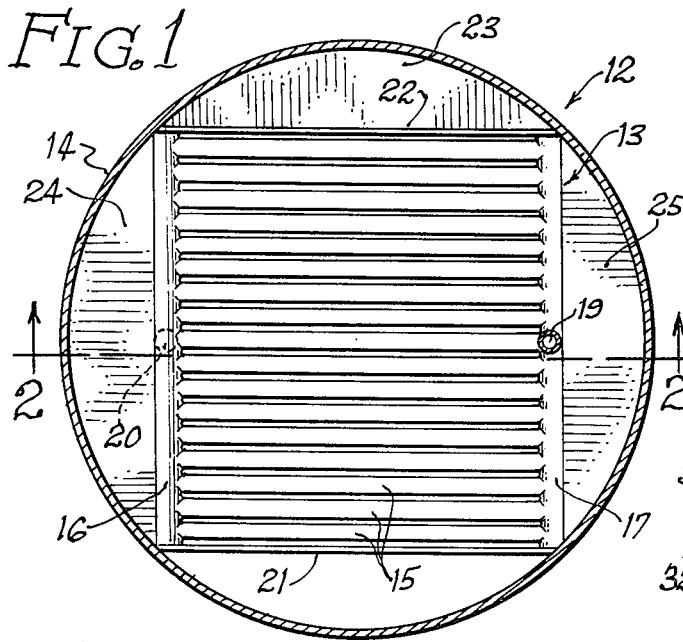
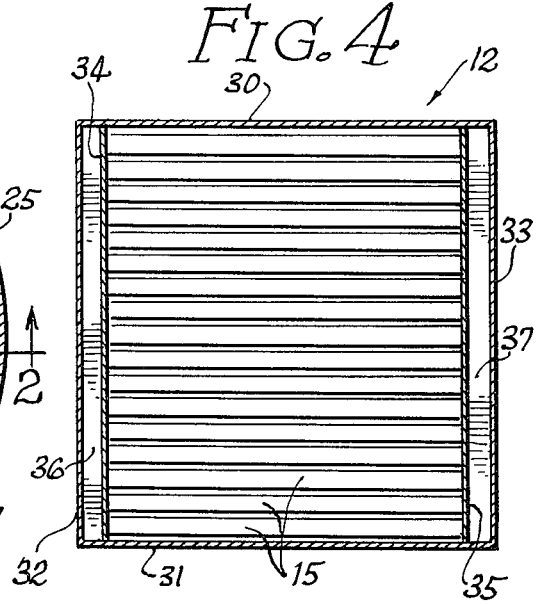
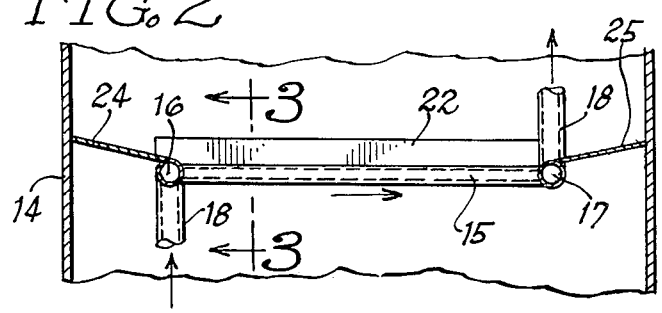
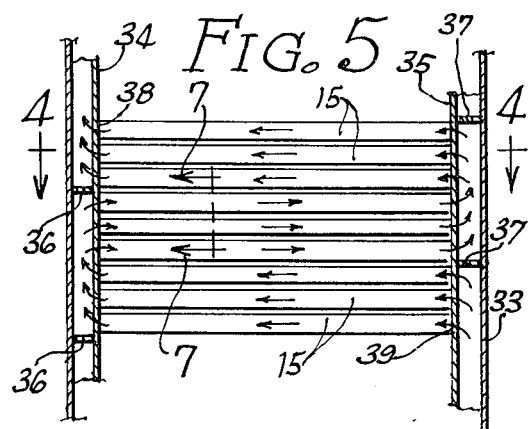
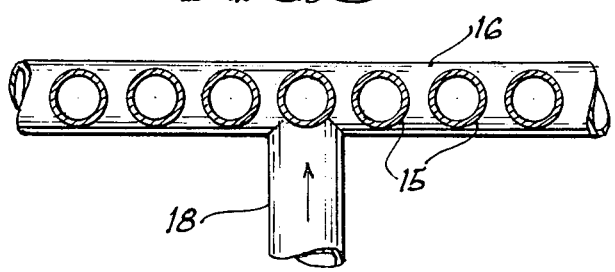
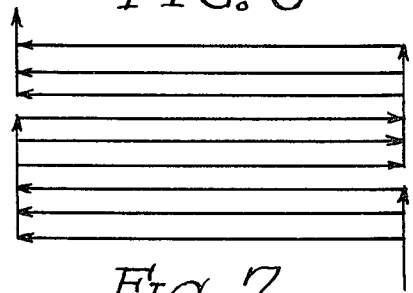
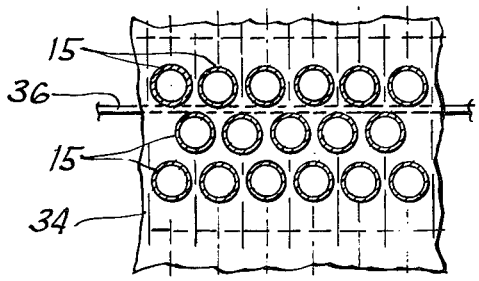

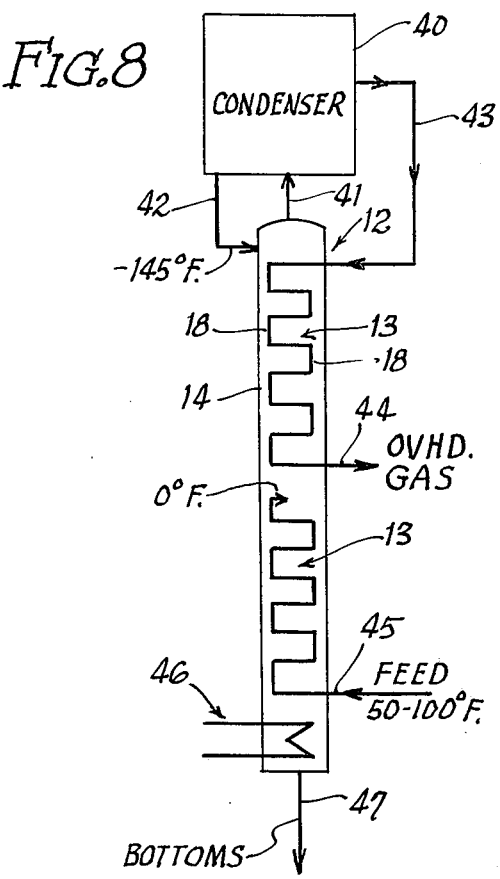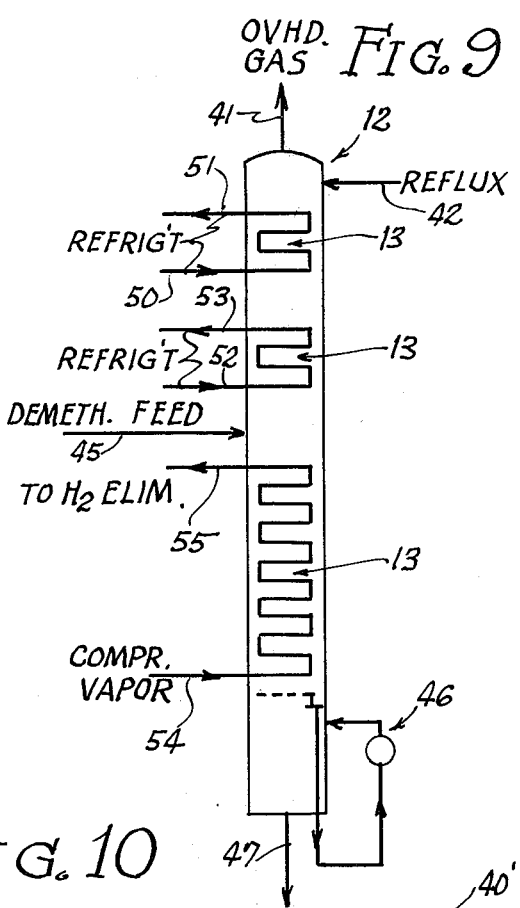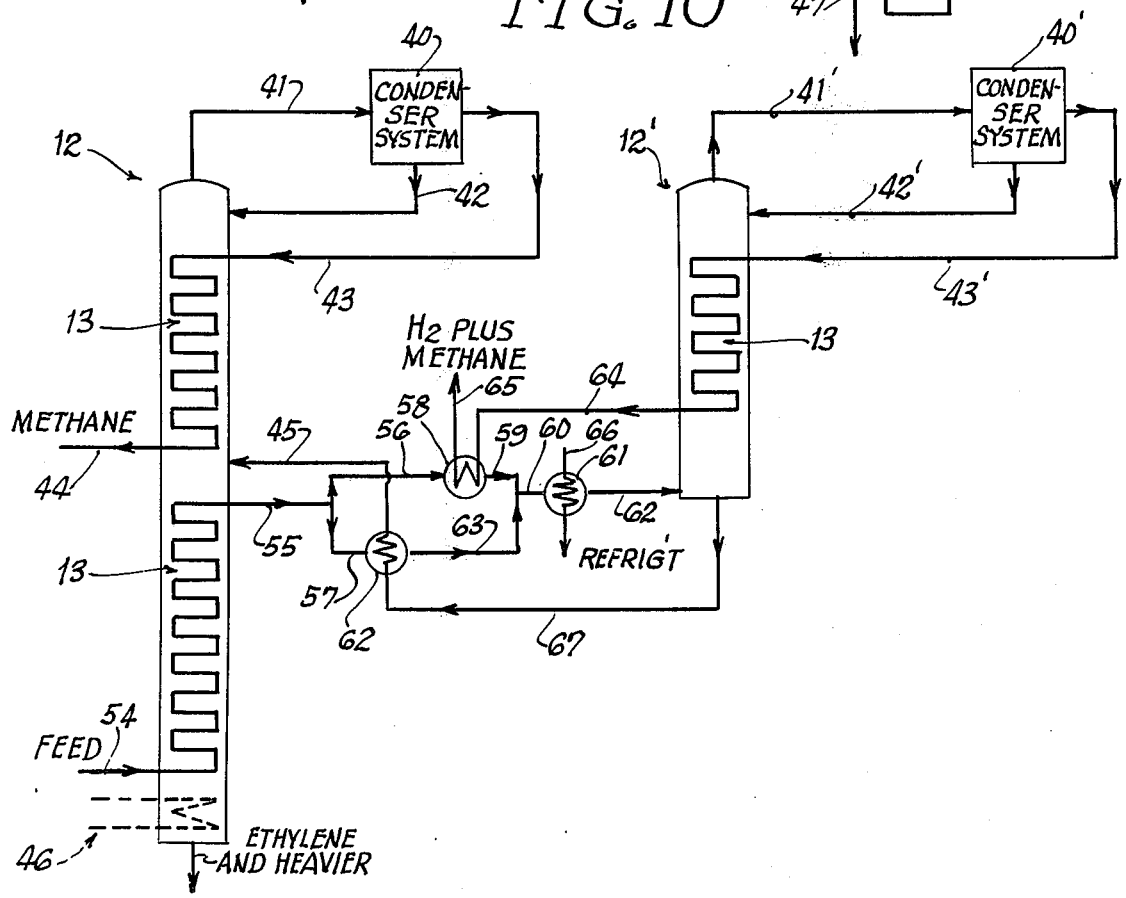

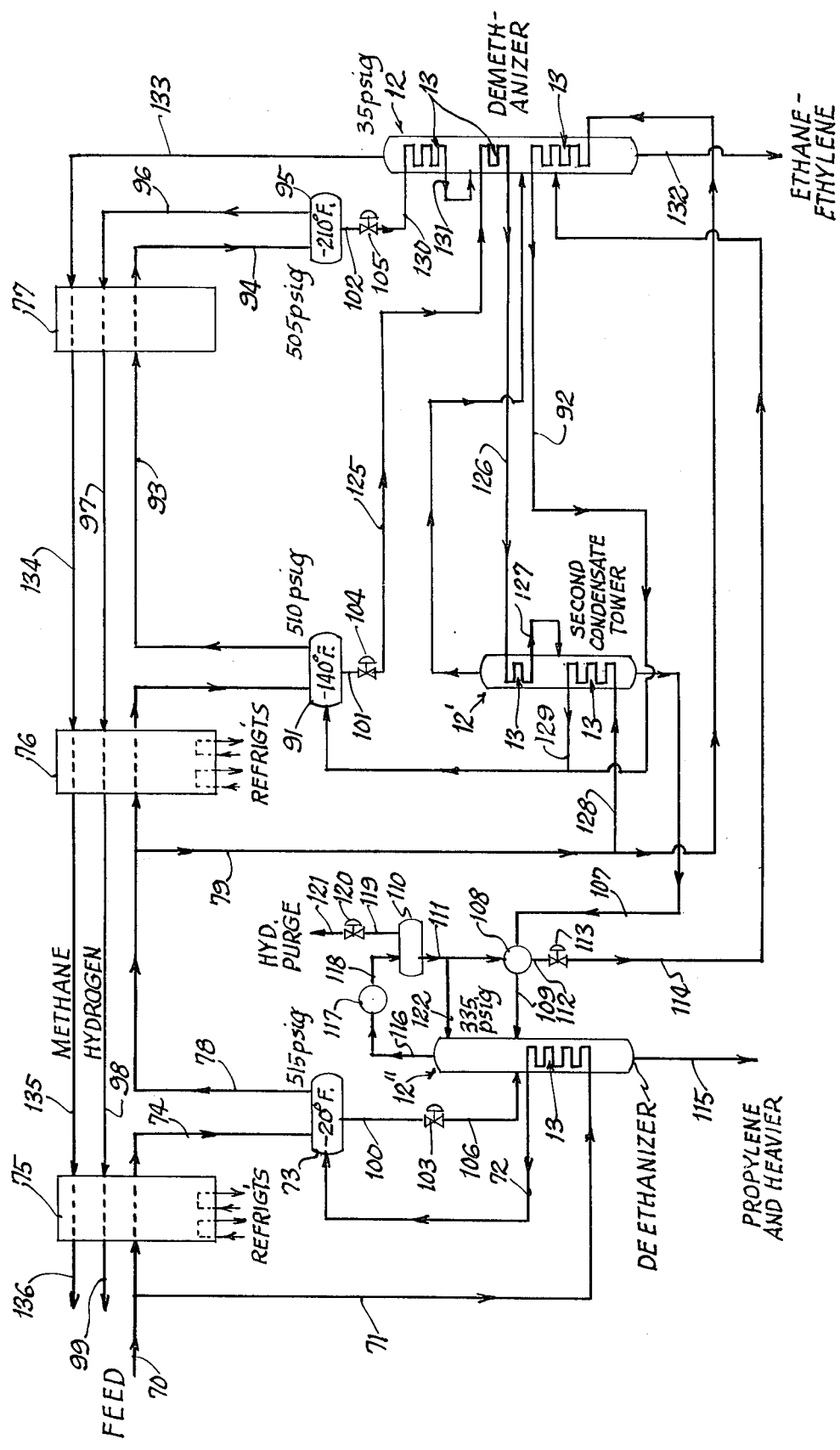

HEAT-EXCHANGER TRAYS AND SYSTEM USING SAME

BACKGROUND OF THE INVENTION

1. Field of the Invention

This invention relates to distillation column internals, particularly distillation trays and an assembly of such trays, to distillation columns including such trays, and to systems utilizing such distillation columns. This invention is directed to a specific construction of distillation trays and an assembly of these trays that, when mounted in a distillation column, provide indirect heat exchange of a fluid with liquid and vapor in the chamber of the distillation column.

2. Description of the Prior Art

The principles and design procedures of distillation to separate a material containing two or more components by boiling the material in liquid form are described in my book entitled "Distillation" published in 1961 by Reinhold Publishing Corporation, New York, N. Y. One of the chapters of the book is directed particularly to column internals including distillation trays. Of the various types of trays of the prior art described in that chapter the most pertinent type of tray is Turbogrid trays that have long narrow slots that could be considered as modified sieve trays. Sieve trays are merely plates perforated with small holes. The Turbogrid trays are made either by stamping slots out of a flat metal plate or by the use of parallel metal bars or slats spaced from one another to provide many long narrow slots for each tray.

As described also in my book mentioned above, there are two types of distillation trays broadly speaking. These are referred to as cross-flow trays and shower-type trays. The former type has a downcomer that carries the liquid to the next lower tray. That liquid flows across the tray and then over a weir to the downcomer. Turbogrid trays are recommended for use as shower-type trays, although they could be used with downcomers. An assembly of vertically tiered distillation trays are disposed within the rectifying section of a distillation column and another assembly of such trays are disposed in the stripping section of the column. The liquid feed is introduced into the column between these two sections.

As mentioned above, the special utility of the invention is in the field of cryogenic distillation, particularly low-temperature distillation of a product from the steam-cracking of light hydrocarbons, to separate ethylene from other components in the cracked gaseous product. A description of low-temperature processing of such cracked gases is presented in the 1946 article entitled "Low Temperature Processing of Light Hydrocarbons" by A. W. Pratt and N. L. Foskett in *Transactions of American Institute of Chemical Engineers*, vol. 42, pages 149–163. With respect to the systems of the present invention, other relevant publications include: the article entitled "Cracked-gas quenching, compression" by S. B. Zdonik et al. in *The Oil and Gas Journal*, Nov. 24, 1969, at pages 96–101; the article entitled "Low-pressure demethanization techniques for ethylene plants" by W. K. Lam et al. in *The Oil and Gas Journal*, May 18, 1970, beginning at page 111; the article entitled "Cryogenic gas-processing plant goes on stream in West Virginia" appearing in the Nov. 24, 1969, issue of *The Oil and Gas Journal* at pages 81–83; and the article entitled "New Flow Sequence for Ethylene Plants" in *Hydrocarbon Processing*, June, 1970, at page 13. With respect to one of the systems of the present invention, one system of the prior art that is generally relevant is U.S. Pat. No. 3,444,696. In none of the prior art including the articles and patent mentioned above is there any disclosure of a distillation tray that is constructed to function also for a heat exchange between liquid and vapor in the column with liquid passing through an assembly of such trays.

SUMMARY OF THE INVENTION

The distillation tray of the invention is referred to hereinafter as a heat-exchanger tray because it also functions to transfer thermal energy between fluid, usually liquid as described below, inside the tray and liquid and vapor outside the tray but within the chamber of the distillation column. The heat-exchanger tray of the invention is constructed to provide the indirect heat exchange with fluid inside the tray flowing transversely of the general direction of flow of the liquid and the vapor in the chamber of the distillation column.

The heat-exchanger tray of the present invention includes a set of parallel horizontal pipes and two manifolds connected to and communicating with opposite ends of the set of pipes and having another opening for each. For intermediate trays these other openings face vertically in opposite directions. For each of the top and bottom trays of an assembly only one of the other openings faces the adjacent tray. Usually the other opening is located to connect to a pipe through the wall of the column. For a system in which liquid feed to the chamber of the column is first passed through an assembly in a stripping section that top manifold has an opening that communicates with the chamber of the column.

The heat-exchanger tray of the invention has its set of parallel horizontal pipes spaced from one another a short enough distance so that the set of pipes will hold a pool of down-flowing liquid through which up-flowing vapor passes after passing through the spaces between the pipes. The heat-exchanger trays of the invention can be constructed so that these spacings are such that the trays function as cross-flow trays or can be constructed so that the trays function as shower-type trays.

When constructed to function as cross-flow trays the liquid in the chamber held as a pool above each tray flows across the tray and over a weir and then downwardly through a downcomer and past a weir to the tray below. This flow is a horizontal flow that is preferably transverse to the axis of the pipes of the set. This pool is fed with liquid that flows across a heat-exchanger tray above that tray and then flows over a weir and through a downcomer. The construction of inlet weirs and exit weirs for the tray and the downcomers is basically their construction for columns using conventional cross-flow trays.

When the heat-exchanger tray of the invention is constructed as a shower-type tray the space between the pipes of the set of pipes of the tray is such that the liquid in the chamber flows down through the openings between the pipes, while at the same time the vapor flows upwardly through these openings. Of course, in this case as with conventional shower-type trays downcomers and weirs are not present.

In one embodiment of the heat-exchanger tray the two manifolds are tubes and their other, usually oppositely facing, vertical openings are located generally centrally of the length of the tubular manifold. When using this embodiment a number of these trays are placed in a vertically-tiered, spaced arrangement as an assembly of heat-exchanger trays. In this assembly of a number of vertically spaced heat-exchanger trays the intermediate trays have, at their oppositely facing openings of their manifolds, tubes connecting those manifolds to similar openings in manifolds of adjacent heat-exchanger trays. The top and bottom heat-exchanger trays of the assembly have only one of their manifolds with the generally central opening facing a similar opening in a manifold of an adjacent heat-exchanger tray, as stated above. A tube is mounted at that opening to connect that opening to the adjacent intermediate heat-exchanger tray. The other manifold of the bottom heat-exchanger tray of the assembly is connected to a pipe that extends through the wall of the distillation column. The other manifold of the top heat-exchanger tray can be connected to a pipe that extends through the wall of the distillation column.

Alternatively, that other manifold of the top heat-exchanger tray is not connected to a pipe extending through the wall of the column so that the fluid passing through the assembly of heat-exchanger trays flows directly into the chamber from one or more openings in that manifold. The alternative construction is used, as mentioned earlier in connection with a broader statement regarding the trays, when the assembly is an assembly in the stripping section of a distillation column for a system in which the liquid feed to the chamber of the column is to be further lowered in temperature prior to its introduction to the central portion of the chamber of the column. For this system the top tray can be constructed without that manifold. Alternatively, the pipes of the top tray can be shorter so that they are used merely to provide multiple introduction of the feed from the assembly to the chamber at that elevation. In that case the exit manifold is not present.

In another embodiment of the heat-exchanger tray a number of the trays are formed as an assembly in which several sets of pipes are disposed in a vertically-tiered, spaced array. In this array one end of the several adjacent sets of horizontal pipes are connected to a manifold so that the manifold communicates with that end of all of those sets of pipes. That manifold extends upwardly from this array and has other openings to communicate with one end of several other adjacent sets of horizontal pipes connected to that manifold and disposed in a vertically-tiered, spaced array above and spaced from the first array. The other end of the sets of pipes of the first array of pipes is similarly connected to a top portion of another manifold having sets of openings communicating with those ends of the sets of pipes at different elevations. The latter manifold has a downward extension that has holes similarly disposed to communicate with one end of another array of sets of pipes that are connected at their other end to the top portion of another manifold. This construction is repeated at both ends of the arrays of pipes so that the overall assembly has many arrays of pipes that are in a vertically tiered or stacked arrangement and that communicate with sets of manifolds that are vertically tiered and that have ends of pipes connected to them. The overall assembly provides sets of manifolds at both ends of the large number of sets of horizontal pipes in a manner that the flow of liquid introduced to the bottom portion of the assembly passes in a criss-cross manner from the bottom part of the assembly to the top part of the assembly. The flow is transversely of the column through several sets of horizontal pipes to a manifold and from it back to another set to another manifold from which it passes in the first transverse direction to a manifold above the second manifold and so forth.

This another embodiment of the heat-exchanger trays and an assembly of these trays is useful when the spacings between the pipes of each set are such that the trays function generally as shower-type trays. In this embodiment the pipes of each set are staggered with respect to the adjacent set so that there is a triangularly-centered pattern. The distance between sets is such that the horizontal pipes of the various sets provide surface over which the down-flowing liquid in the chamber of the column distributes itself, while the up-flowing vapors contact that liquid. As mentioned above, the liquid flows through the pipes generally upwardly but in a circuitous path, that is, criss-cross path. In this embodiment downcomers and weirs are not present and the cross section of the distillation column, at least at the elevation of the assembly of the arrays of sets of pipes, can be rectangular.

In view of the foregoing description of the heat-exchanger tray of the invention and the assembly of heat-exchanger trays of this invention, it is apparent that the distillation column of the invention includes, as an internal, such assembly that may be located in the rectifying section of the column or in the stripping section of the column or such assembly can be located in each of these sections.

As indicated above also, such assembly in the distillation column can be constructed so that the top set of pipes feed liquid directly into the chamber of the distillation column for specific systems of the invention using an assembly of the heat-exchanger trays. In that system the liquid feed to the chamber of the distillation column is passed through this assembly of heat-exchanger trays. If that system also has an assembly of heat-exchanger trays in the rectifying section, the top and bottom heat-exchanger trays of that assembly have their inlet and outlet manifolds connected to pipes extending through the wall of the column.

In other systems of the invention the top and bottom trays of the assembly in the rectifying section or in the stripping section or in both sections have their appropriate manifold connected to a pipe extending through the wall of the distillation column so that there is indirect heat-exchange utilization by the liquid flowing through the assembly of heat-exchanger trays in a circuitous path, while the trays function also as distillation trays.

The assembly of heat-exchanger trays can be used in various systems that have the assemblies present in a number of distillation columns. In these systems the various systems of flow of liquid through the assemblies are such that liquid passing into and through one of the assemblies of heat-exchanger trays is fed to a second column containing one or more assemblies of heat-exchanger trays through which pass other liquids obtained by cooling vapor effluent from the second column or obtained from other distillation columns.

The overall systems provide sufficient heat transfer utilization by these assemblies so that tonnage requirement of refrigerant for cryogenic distillation is reduced. In such systems, as pointed out later, the efficiency of the stages would be decreased so that the number of fractionation trays would be increased. However, this additional cost for the increased fractionation trays would be small in comparison with the savings in refrigeration costs.

DESCRIPTION OF THE DRAWINGS

In the drawings similar parts are generally designated by the same numeral.

FIG. 1 is a horizontal cross section of a distillation column of the invention at an elevation just above the location of the preferred embodiment of the heat-exchanger tray of the invention.

FIG. 2 is a cross section taken along the line 2—2 of FIG. 1.

FIG. 3 is an enlarged fragmentary cross section of the heat-exchanger tray taken along the line 3—3 of FIG. 2.

FIG. 4 is a horizontal cross section taken along line 4—4 of FIG. 5 of a distillation column of the invention showing another embodiment of the heat-exchanger tray of the invention in the distillation column that has a rectangular cross section at least in its portion containing an assembly of these trays.

FIG. 5 is a fragmentary vertical cross section of the distillation column of FIG. 4 showing an assembly of heat-exchanger trays of that other embodiment.

FIG. 6 is a diagrammatic presentation of the nature of the flow of liquid through the various assemblies of heat-exchanger trays in the assembly of these heat-exchanger trays shown in FIG. 5.

FIG. 7 is a view taken along line 7—7 of FIG. 5.

FIGS. 8, 9, 10 and 11 are schematical illustrations of various systems of the invention containing heat-exchanger trays as assemblies in various distillation columns of the invention.

DETAILED DESCRIPTION

FIGS. 1, 2 and 3 show a distillation column of the invention in which the column includes an assembly of the preferred embodiment of the heat-exchanger trays. The column is generally indicated at 12. In these figures only one heat-exchanger tray generally indicated at 13 is completely shown. The distillation column 12 has a wall 14. In view of the flow of liquid to, through, and from tray 13, as indicated by arrows on FIGS. 2 and 3, tray 13 is one of an assembly of these trays mounted within column 12 in the stripping section. That embodiment of the assembly and the other embodiment of the assembly of the invention are shown schematically in the one or more zones of various columns in FIGS. 8 through 11.

The heat-exchanger tray 13, in the embodiment shown in FIGS. 1–3, includes a set of parallel horizontal pipes 15. One end of each of pipes 15 is connected to a manifold pipe 16 that has holes communicating with that open end of pipes 15. The other end of pipes 15 is connected to a manifold pipe 17. The manifold pipe 17 similarly has openings communicating with that other end of pipes 15. The tray 13 has a vertical tube 18 that is connected to manifold pipe 17 and extends upwardly from manifold pipe 17. The bottom open end of tube 18 communicates with an upwardly facing opening 19 (FIG. 1) in the central portion of manifold pipe 17. The manifold pipe 16 (FIG. 1) has a centrally located, downwardly facing opening 20. The trays 13 of the assembly of them are alternately disposed so that tray 13, that is immediately above tray 13 shown in FIG. 2, is placed so that its manifold pipe 16 is connected to the righthand end (as viewed in FIG. 2) of its pipes 15 and its manifold pipe 17 is connected to the lefthand end (as viewed in FIG. 2) of its pipes 15. Thus tube 18 shown in FIG. 2 is connected to manifold pipe 16 of the adjacent upper tray 13 so that opening 19 of tray 13 shown in FIG. 2 communicates through tube 18 with opening 20 of the adjacent tray 13 above. Similarly, the next adjacent tray 13, that is below tray 13 shown in FIG. 2, has its tube 18 connected at its top end to manifold pipe 16 at opening 20 of tray 13 that is shown.

As seen in FIG. 1, heat-exchanger tray 13 in a plan view has a rectangular outline and the corners of it abut cylindrical wall 14 of column 12. The pipes 15 of tray 13 are spaced from one another, as described earlier, so that a pool of liquid is maintained on heat-exchanger tray 13. At two of the opposite sides of each tray 13 an exit weir 21 and an inlet weir 22 are mounted. The spacing between pipes 15 is such that tray 13 is a cross-flow type of tray. Being this type of tray it also requires a downcomer (not shown) extending downwardly as a downward extension of exit weir 21. The inlet weir 22 is mounted on a fixed plate 23 that extends from wall 14 to that side of tray 13. The plate 23 prevents countercurrent flow of liquid and vapor through this space between tray 13 and wall 14. The ends of each of weirs 21 and 22 abut wall 14 from the abutment of closed ends of manifold pipe 16 and manifold pipe 17. The weirs 21 and 22 are spaced from adjacent pipe 15 so that the distance from pipe 15 approximates the distance between adjacent pipes 15.

Because in the illustration tray 13 is rectangular and because wall 14 is cylindrical at the elevation of an assembly of trays 13, there is a space between portions of wall 14 and the other pair of opposite sides of tray 13 defined by manifold pipes 16 and 17. These spaces are closed by fixed inclined plates 24 and 25, respectively. The plate 24 has its lower edge mounted on manifold pipe 16, while the lower edge of plate 25 is mounted on the top of manifold pipe 17. The plates 24 and 25 prevent upward passage of vapor through these spaces between pipes 15 of tray 13. Preferably the fixed plates 24 and 25 are downwardly inclined to manifold pipes 16 and 17, respectively, of tray 13, as shown, to prevent accumulation of some liquid in an area where it would remain rather than passing across pipes 15 from weir 22 to weir 21.

An assembly of trays 13 are shown schematically in several places in FIGS. 8–11. It is apparent from those schematic illustrations that in most assemblies the top and bottom trays 13 differ only in one respect from intermediate trays 13. In most of the assemblies both top and bottom trays 13 have their manifold pipes 16 connected to a pipe that extends through wall 14. That pipe is connected to another pipe identified in FIGS. 8 through 11 by specific lines depending on the system described. The connection of such pipe would be at a central opening like opening 20, but it can be facing wall 14 rather than extending downwardly so that the inlet or outlet pipe, as the case may be, can extend horizontally from manifold pipe 16 through wall 14 for the entire length between the central portion of manifold pipe 16 and wall 14.

As seen in FIG. 8, column 12 can have two assemblies of trays 13. One assembly is in the rectifying section and the other assembly is in the stripping section. In the system of FIG. 8 the assembly of the trays 13 in the stripping section has a top tray 13 that is merely a combination of manifold pipe 16 and a set of pipes 15 that are shorter than those in the other trays and that are open at the other end to introduce liquid, that has passed through the assembly, directly into the chamber of column 12. Instead of these short pipes 15 being present manifold pipe 16, connected to the uppermost tube 18, can have one or more of the openings that it would have for a connection to pipes 15, and liquid would flow directly into the chamber from manifold pipe 16.

Referring to FIGS. 4 through 7, column 12 has, at the location of heat-exchanger trays of this embodiment, a rectangular cross section defined by a pair of opposed walls 30 and 31 and a pair of opposed walls 32 and 33. Within the zone containing the assembly of heat-exchanger trays of this embodiment vertical walls 32 and 33 each provides an outer wall of a number of vertically tiered set of manifolds.

Adjacent but spaced from and parallel to walls 32 and 33 are plates 34 and 35. The plates 34 and 35 extend between walls 30 and 31 of column 12. One vertical margin of wall 30 and the opposed vertical margin of wall 31 cooperate with wall 32 and plate 34 to provide a narrow chamber inside column 12 adjacent wall 32. Similarly, the other vertical margins of walls 30 and 31 cooperate with wall 33 and plate 35 to provide a closed chamber inside column 12 adjacent wall 33. Within the chamber between wall 32 and plate 34 at variour elevations there are horizontal plates 36 extending from wall 31 to wall 30. Adjacent plates 36 in cooperation with wall 32, plate 34 and walls 30 and 31 provide a manifold. The chamber defined by wall 33, plate 35, and walls 30 and 31 has similar plates 37 to separate the chamber into a number of similar manifolds. The elevations of plates 37 are staggered with respect to the elevations of plates 36 so that the upper portion of each manifold between plates 36 is at the elevation of the lower portion of a manifold between plates 37.

Horizontally across vertical plate 34 at various elevations there is a set of openings 38 and one end of a corresponding set of pipes 15 is connected to plate 34 so that the open end of those pipes communicate with one of the manifolds between plates 36 at those openings. A similar number of openings 39 are in plate 35 for communication of each of the other manifolds between plate 37 with the other end of pipes 15 mounted on plate 35. For each horizontal set of pipes 15 the spacing is such that in combination with the spacing between adjacent horizontal sets along with the staggered arrangement of pipes 15 in one set vis-a-vis adjacent sets, i.e., a triangularly-centered pattern, are such that liquid in the chamber flows generally downward countercurrent to upwardly flowing vapor as described earlier for a counterflow of liquid and vapor obtained generally by the use of conventional shower-type trays.

In this other embodiment of heat-exchanger tray, shown in FIG. 4–7, each tray of that embodiment can be considered as including for the illustration three adjacent levels of sets of pipes 15 and the manifold that is connected to one end of pipes 15 of these three levels of pipes. By analogy with heat-exchanger tray 13 shown in FIGS. 1–3 it can be said that the manifold at each end of the three sets of pipes is between adjacent plates 37. The bottom portion of that manifold is equivalent to manifold pipe 17 of the other embodiment of tray 13, while the top portion of the manifold of the embodiment of FIGS. 4–7 is generally the equivalent of tube 18. Of course, that upper portion of the manifold between adjacent plates 37 also constitutes the equivalent generally of manifold pipe 16 for the next three upper levels of sets of pipes 15.

In most uses of the assembly described above and shown in FIGS. 4–7 the fluid to be passed through the various assemblies of heat-exchanger trays is introduced through an opening in wall 32 or wall 33. A feed pipe is connected to that plate (plate 32 or plate 33) which provides the inlet manifold for the lowest levels of sets of pipes 15. Similarly, an outlet pipe is connected to that plate of column 12 that provides part of the construction of the final exit manifold. Of course, instead of this exit pipe the uppermost manifold can have openings to pass the fluid, when it is a liquid feed, directly into the chamber of column 12.

In an ethylene plant light hydrocarbon feed stocks (ethane or propane) and/or heavy hydrocarbon feed stocks are pyrolytically treated to produce a cracked gas containing hydrogen, methane, ethylene, ethane, and heavier hydrocarbons. As pointed out on page 150 of the article by A. W. Pratt et al. mentioned above, the ethylene-bearing gas from the cracking furnace is compressed in a number of stages to a substantial pressure, illustratively 600 p.s.i.g. The gas is cooled between stages and small quantities of condensate and water are removed in interstage separators. The gas leaving the last stage of compression is cooled by cooling water and subcooled by high level refrigeration to about 70°F. After removal of water and hydrocarbon condensate the cracked gas is then passed through dehydrators to remove remaining moisture. The dried gas is then cooled too 0°F. and fed to a demethanizer distillation column. The overhead from the distillation column is passed to a runback type condenser refrigerated by the evaporation of liquid ethylene at 5 p.s.i.g. The reflux temperature shown in that article is about −130°F. From this condenser system hydrogen and methane are released to the plant fuel system, according to Pratt et al.

The embodiment of the demethanizer system shown in FIG. 8 of the attached drawings differs in several respects from the demethanizer distillation column mentioned above and described on page 150 of the Pratt et al. article. In the system of FIG. 8 the demethanizer distillation column contains an assembly of heat-exchanger trays 13 interconnected, as described earlier, in the rectifying section of column 12 instead of conventional distillation trays. Of course, the rectifying section can contain conventional distillation trays above and below this assembly of interconnected heat-exchanger trays 13. The condenser 40 that receives overhead vapor from column 12 by line 41 provides reflux liquid at an illustrative temperature of −145°F. to the top point of column 12 by a line 42, while the off gas from the condenser 40 is fed by a line 43 passing through wall 14 and connected to a pipe connected to manifold pipe 16 of the uppermost tray 13 of the assembly in the rectifying section. The off gas, containing primarily hydrogen and methane, passes through this assembly of trays 13 and from the lowermost tray 13 it passes by a pipe through wall 14 to a line 44 for release to the plant fuel system or other use.

Another difference between the system disclosed in FIG. 8 and the demethanizer system disclosed in the Pratt et al. article, is the use, in the stripping section of an assembly of interconnected heat-exchanger trays 13 instead of conventional distillation trays. In the system of FIG. 8 that assembly is used to receive and pass through its manifold pipes 16 and 17 and pipes 15 the feed which is the dried gas as used by Pratt et al. However, the feed has not been cooled to 0°F. Instead the feed is used illustratively at a temperature of about 50°F. to about 100°F. The feed is introduced by a line 45 connected to a pipe that passes through wall 14 and that is connected to manifold pipe 16 of bottom tray 13 of the assembly. The top tray 13 of this assembly in the stripping section has the construction mentioned above in which manifold pipe 17 is absent and pipes 15 of that tray 13 are short so that the feed is introduced from those pipes directly into the chamber. Of course, the top tray 13 could be constructed conventionally in accordance with this invention and a pipe from it could lead through wall 14, and then back through wall 14 at a higher elevation for passing the feed into the chamber of column 12.

In the system shown in FIG. 8 there is a reboiler generally indicated at 46 but this is not a difference between the system of FIG. 8 and the demethanization column shown by Pratt et al.

The ethylene and heavier hydrocarbons are withdrawn from the bottom of column 12 by a line 47.

In a conventional demethanizer of the prior art a very large amount of very-low-temperature refrigeration is required to produce a reflux having a temperature of about −145°F. Consequently the equipment investment and operating costs are high. By using the system of the invention in which the demethanization column is column 12 containing the assembly of heat-exchanger trays 13 in the rectifying section of the column and passing through that assembly the off gas from the condenser, there is a reduction in the amount of very-low-temperature refrigeration required. This is because the cold off gas, at the illustrative temperature of −145°F., passes through trays 13 countercurrent to the rising vapors in the chamber of column 12. By this indirect heat-exchange there is a transfer of thermal energy from the rising vapors to the off gases. This transfer reduces the very-low-temperature refrigeration requirement for condenser 40 by an equal amount of British thermal units (Btu).

Because the system of FIG. 8 provides for introduction of feed to bottom tray 13 of the assembly of trays 13 in the stripping section and through the assembly and then directly into the chamber at the top elevation of that assembly of trays 13, there is a countercurrent flow of feed in the assembly and liquid in the stripping section of the chamber. Due to the indirect heat exchange each Btu transferred from the feed in that assembly of trays 13 to that liquid in the chamber in the stripping section reduces the load on intermediate level refrigeration equipment for feed by an equal amount. When the feed is introduced into the assembly in the stripping section at a temperature obtained from the drying operation the intermediate level refrigeration is not required.

As in the case described above for the rectifying section, the stripping section may also contain conventional distillation trays. These could be below the assembly of trays 13 in the stripping section. In the event that the feed passes from the assemblies out through the wall 14 and back through wall 14 at level spaced some distance above the top of that assembly for introduction to the chamber, there can be located a number of conventional distillation trays between the point of introduction of feed to the chamber and that assembly of trays 13 in the stripping section.

By the use of the system of FIG. 8 with the assembly of trays 13 in both the rectifying section and the stripping section, with one utilizing off gas and the other using feed for the column, instead of a system using conventional distillation trays in both sections as described by Pratt et al., the number of trays required for both sections of the column is greater. However, this increase in cost should be small in comparison with the savings in refrigeration. Of course, the system can use the assembly of trays 13 in the rectifying section with conventional distillation trays in the stripping section. In that case the feed would be introduced by line 45 to a pipe located between the two sections and passing into the chamber between these two sections. In that case the temperature of the liquid feed would be conventional temperature as shown by Pratt et al.

The embodiment of the system of the invention that is shown in FIG. 9 includes a demethanization distillation column 12. The system shown in FIG. 9 differs in several respects from the system shown in FIG. 8. Instead of the assembly of heat-exchanger trays 13 in the rectifying section using off gas from condenser 40, the rectifying section in column 12 of the system of FIG. 9 contains two assemblies of trays 13 that are at different levels of the rectifying section. The upper assembly of these has a refrigerant passing through it that is introduced by a line 50 and is withdrawn by a line 51. The lower assembly of these has a refrigerant introduced by a line 52 and it is withdrawn through a line 53.

Another difference is the introduction of feed for demethanizer column 12. The line 45 introduces this feed directly into the chamber between the rectifying and stripping sections. The stripping section has an assembly of heat-exchanger trays 13 connected to an inlet line 54 and an outlet line 55. The line 54 feeds a compressed vapor that is the cracked product after it has been compressed as described earlier in connection with the overall ethylene plant but before it has been treated for removal of hydrogen. The exit compressed vapor from this assembly passes by line 55 to a part of this system for elimination of hydrogen before the compressed vapor is introduced as a feed to column 12 by line 45. The manner of this elimination of hydrogen exiting by line 55 is described below in connection with FIG. 10. The compressed vapor fed by line 54 can be precooled somewhat, if desired. That compressed vapor feed in the assembly of trays 13 in the stripping section gives up some of its heat to the contents of the stripping section of the chamber and thereby substitutes in part or completely for reboiler heat. This reduction or elimination of reboiler heat reduces the heat load on the refrigeration system by an equal amount.

The two assemblies of trays 13 in the rectifying section with their flow of refrigerant through them transfers a considerable load of lower-temperature-level refrigeration to higher-temperature-level refrigeration of the overall system of the ethylene plant.

The column 12 as shown is provided with a reboiler generally indicated at 46 as in the system of FIG. 8 but it can be eliminated in certain cases, as mentioned above.

The bottoms are removed by line 47 and the overhead is removed by line 41 as described for the system of FIG. 8. The bottoms contain ethylene, ethane and heavier hydrocarbons. The overhead by line 41 is connected to a condenser system that provides a reflux to the top of the chamber of column 12 by line 42. It is noted that in this embodiment of the system the cold off gas from the condenser is not utilized by an assembly of trays 13 in the rectifying section of the chamber.

The reference to the use of compressed vapor in line 54 and its passage through the assembly of trays 13 before it is passed by line 55 to the hydrogen eliminator is not meant to imply that all of that compressed vapor must pass through this assembly of trays 13 in column 12. Only part of it may be used, if desired.

Referring to FIG. 10, the system of that embodiment of the system of the invention has demethanizer column 12 with an assembly of heat-exchanger trays 13 in the rectifying section and an assembly of heat-exchanger trays 13 in the stripping section.

The assembly of trays 13 in the rectifying section is the same as shown in the rectifying section of column 12 of the system of FIG. 8 and through it passes the off gas that is primarily methane introduced by line 43 and that is obtained from condenser system 40. From condenser system 40 there is also obtained reflux liquid that is passed by line 42 to the top part of the chamber of column 12. The feed to condenser system 40 is the vapors passing overhead from column 12 and through line 41. The exit off gas from this top assembly of trays 13 is removed by a line 44.

The assembly of trays 13 in the stripping section of column 12 receives at its bottom tray 13 a feed by line 54 and the cooled feed passes out from the top tray 13 to line 55 that is connected to a line 56 and a line 57. From line 56 the product from line 55 passes through a heat exchanger 58, a line 59, a line 60, a heat exchanger 61, and a line 62 that feeds the product to the bottom part of a distillation column 12'. The line 57 feeds the other part of the product from line 55 through a heat exchanger 62, a line 63 and line 60 where it joins the other part of the product introduced from line 59 that provides the rest of the feed to column 12.

Above the location of feed from line 62 the chamber of column 12' contains an assembly of heat-exchanger trays 13 that has its top tray connected to a line 43' that receives off gas from a condenser system 40'. The other product from condenser system 40' is reflux to the chamber of column 12'. That reflux is fed to the top part of the chamber by a line 42'. The overhead from column 12' is fed to condenser system 40' by a line 41'.

The bottom tray 13 of the assembly in column 12' has its outlet connected to a line 64 that is connected to heat exchanger 58 for indirect heat exchange with the product from line 56 that passes through heat exchanger 58. The off gas from line 64 after passing through heat exchanger 58 is removed by a line 65. That off gas is primarily hydrogen but contains some methane.

The heat exchanger 61 provides indirect heat exchange with the product introduced through line 60 to cool it by the use of a refrigerant passing through exchanger 61 and introduced by a line 66.

The bottoms from column 12' are withdrawn by a line 67 that is connected to exchanger 62 for indirect heat exchange with the product that is introduced to exchanger 62 by line 57. The bottoms from line 67 are transferred from exchanger 62 by line 45 as feed to column 12.

In the system of FIG. 10 the feed to column 12' is cooled as it passes through the stripping section of column 12 for the advantage mentioned above. In addition, this feed by passing through exchangers 62 and 58 is further cooled so that the load requirement for cooling of feed to column 12' by exchanger 61 using a refrigerant is decreased. The cooling by exchanger 58 is a a utilization of the low temperature of the off gas from condenser system 40' that is first utilized in the assembly of heat-exchanger trays 13 in column 12'. This is one of the means of reducing the refrigeration requirement of exchanger 61, while the other is the cooling by exchanger 62 that serves at the same time as a means of raising the temperature of the feed from column 12' to column 12 by line 45. The overall system minimizes the refrigeration power requirement for the demethanization operation of an ethylene plant.

The demethanization operation in an ethylene plant accounts for a substantial part of the investment of the plant. This high cost results from the very low temperatures that must be used in separating hydrogen and methane from ethylene for fractionation. Rather complicated designs have been proposed in an attempt to minimize refrigeration costs. The system shown in FIG. 10 is a much simpler system than proposed by others but it is believed that this system is more efficient thermodynamically and should reduce refrigeration costs substantially. The key features of the system of FIG. 10 are the use of two columns, mainly, columns 12 and 12' with their assemblies of heat-exchanger trays 13 and with the use of exchangers 58 and 62 in the manner described above. The use of the columns avoids an inefficiency inherent in a more complicated proposed design mentioned above. That inefficiency results from a large temperature gradient at the feed tray that is caused by the presence of large amounts of hydrogen above the feed inlet. The heat-exchanger trays 13 in columns 12 and 12' recover refrigeration from the process streams. Each increment of refrigeration recovered in the rectifying section of column 12 and column 12' reduces the low-temperature-refrigeration requirement in the condensing systems by an equal amount. Taken together the two features of FIG. 10 provide for a more efficient demethanization operation.

The condenser systems 40 and 40' shown in the various systems of the invention in FIGS. 8–10 can be simple refrigerated condensers but preferably involve expansion devices. Such condensing system can be any conventional construction.

Various specific arrangements that have been employed for the cryogenic separation of hydrogen and methane from the ethylene and heavier gases in the cracked gas from pyrolysis furnaces are known in the prior art. One system, after compressing the cracked gas to about 500 p.s.i. and drying it, includes a cooling of the dried gas at this pressure to about −210°F. in three stages using first, second and third heat exchangers with interstage flashing to remove condensate. The three condensate streams are then fed to a demethanizer distillation column operating at about 500 p.s.i. and with a top temperature of about −140°F. The off-gas stream from the third flash drum and the off-gas overhead stream from the demethanizer column are expanded to lower their temperatures. These off-gas streams are then passed through the third heat exchanger, the second heat exchanger and the first heat exchanger in that order. The passage of these off-gas streams is countercurrent to the passage of gas from the second and first interstage flashing and the feed to the first heat exchanger in that order. In this system the demethanizer column uses conventional distillation trays.

Another embodiment of the system of the invention is shown in FIG. 11. That embodiment is a modification of the system described in the next preceding paragraph. The system of FIG. 11 differs from that last-mentioned system of the prior art in several respects including the use of three assemblies of heat-exchanger trays 13 of the invention in demethanizer column 12. Another difference for the system of FIG. 11 is the reduction of pressure of feed to demethanizer column 12 so that column 12 is operated at a pressure of less than 300 p.s.i. and illustratively 35 p.s.i.g. Instead of feeding the second condensate stream to the demethanizer distillation column in the system of FIG. 11, this second condensate stream is passed after pressure reduction through the intermediate assembly of trays 13 in demethanizer column 12 and then from that assembly through an assembly of trays 13 in a rectifying section of a second condensate tower and finally directly into that tower as a feed between that assembly of trays 13 and another assembly of trays 13 in the stripping section of that tower. The overhead from that second condensate tower is the feed to demethanizer column 12, instead of the second condensate that is fed directly to the demethanizer column in the prior system.

In the system of FIG. 11 the dried cracked gas is fed by a line 70. Part of the feed in line 70 is passed from it to a line 71 that is connected to the bottom tray 13 of an assembly of these trays that is in the stripping section of a deethanizer column 12''. The top tray 13 has its manifold pipe 17 connected to a pipe extending through the wall of column 12. That pipe is connected to a line 72 to provide a part of the feed to a flash drum 73. The other part of the feed to flash drum 73 is by a line 74 that receives the other part of the feed in line 70 after that portion of the feed has passed through a first heat exchanger 75.

The second and third heat exchangers 76 and 77 constitute with first heat exchanger 75 the three heat exchangers comparable to the heat exchangers mentioned above as being a part of the three-stage cooling in the prior system. As in the case of that prior system both the first head exchanger and the second heat exchanger are provided with unnumbered inlet pipes and outlet pipes for refrigerants as shown.

The flashed vapor from drum 73, that is illustratively at the indicated 515 p.s.i.g. and operated at −25°F. obtained by the cooling in exchanger 75 after prior compression of feed is passed by a line 78 through second exchanger 76. A line 79 removes part of the vapor from line 78 before it passes through exchanger 76. The flashed vapor in line 79 is passed through an assembly of trays 13 in the stripping section of demethanizer column 12 for providing thermal energy to that section of the column and at the same time providing a partial refrigeration of that diverted part of flashed vapor that otherwise would pass through exchanger 76 and then by a line 90 to a second flash drum 91. The drum 91 is illustratively operated at essentially the same pressure as drum 73. The drum 91 is at an illustrative temperature of −140°F. That temperature is partially achieved by the passage of flashed vapor from line 78 through exchanger 76. The passage of another part of the flashed vapor from the first flashing stage by use of line 79 to the assembly of trays 13 in the stripping section of column 12 partially lowers the temperature of part of the feed that passes from that assembly of trays 13 by a line 92 to second flash drum 91. Thus the refrigeration requirement of heat exchanger 76 to obtain an overall temperature in drum 91 is substantially reduced.

The flashed vapor from second flash drum 91 is transferred by a line 93 through third exchanger 77 and then by a line 94 to a third flash drum 95. The flashed vapor in line 93 is cooled sufficiently in exchanger 77 so that the temperature in drum 95 is illustratively −210°F. Of course, the pressure is illustratively 505 p.s.i.g. The gas flashed from drum 95 is primarily hydrogen. That gas passes by a line 96 through heat exchanger 77, then by a line 97 through heat exchanger 76 and finally through first heat exchanger 75 after passing through a line 98. This gas exits from exchanger 75 by a line 99.

The condensate from drums 73, 91 and 95 exits through lines 100, 101 and 102, respectively. From these lines the condensates pass through pressure reducers 103, 104 and 105, respectively.

The condensate from drum 73, after passing through line 100 and pressure reducer 103 that reduces the pressure illustratively to 335 p.s.i.g., is introduced by a line 106 as feed to deethanizer distillation column 12''. The bottoms from second condensate tower 12' is withdrawn by a line 107 and after passage through a heat exchanger 108 and a line 109 this bottoms from second condensate tower 12' is another feed to column 12''.

The bottoms from second condensate tower 12' provides a cooling of a part of the liquid withdrawn from a flash drum 110 by a line 111. That part of the withdrawn liquid in line 111 passes through exchanger 108 in indirect heat exchange with the bottoms from second condensate tower 12' and passes through a line 112 and a pressure reducer 113 to a line 114. From line 114 it is fed to the stripping section of demethanizer column 12.

The bottoms from deethanizer distillation column 12'' are removed by a line 115. These bottoms contain propylene and heavier (higher-boiling) hydrocarbons.

The overhead from column 12'' is removed by a line 116. After passage through a heat exchanger 117 the overhead passes by a line 118 to flash drum 110. The flashed vapors from flash drum 110 are removed by a line 119 connected to a pressure reducer 120 that is connected to a purge line 121. The gas exiting line 121 is primarily hydrogen.

Part of the liquid removed from flash drum 110 by line 111 is returned as reflux to the top part of the chamber of deethanizer column 12'' by a line 122 connected to line 111 and to column 12''. The deethanizer column 12'' may have conventional distillation trays (not shown) in the rectifying section that is, of course, above the inlet of feed from lines 106 and 109.

The pressure reducer 104 reduces the pressure of condensate removed from drum 91 by line 101 to the pressure of second condensate tower 12' that is about the same pressure as maintained in column 12. The condensate from pressure reducer 104 passes through a line 125 and then through the intermediate assembly of trays 13 in column 12 that have been mentioned above. The bottom tray 13 of that assembly is connected by a pipe to a line 126 that is connected to the inlet top tray 13 of an assembly of trays 13 in the rectifying section of second condensate tower 12'. The bottom outlet tray 13 of that assembly of trays 13 in the rectifying section of tower 12' is connected by a line 127 that introduces this condensate into the chamber at a lower position as feed to second condensate tower 12'.

As mentioned earler, part of the flashed vapor in line 78 that comes from flash drum 73 passes through line 79. A part of that flashed vapor in line 79 from first flash drum 73 is passed by a line 128 to the bottom inlet tray 13 of the assembly of trays 13 in the stripping section of second condensate tower 12', while the rest of the flashed vapor in line 79 passes, as described earler, through the assembly of trays 13 in the stripping section of demethanizer column 12. The top exit tray 13 of that assembly in the stripping section of second condensate tower 12' is connected to a line 129 that feeds this flashed vapor to line 92 for passage to flash drum 91. By this passage of still another part of flashed vapor from the first flash drum 73, a second part of flashed vapor from drum 73 is passed to flash drum 91 without passage through second exchanger 76. That portion of the flashed vapor from drum 73 is cooled by passage through second condensate tower 12'. This further reduces the refrigeration load of heat exchanger 76.

The pressure reducer 105 reduces the third condensate withdrawn by line 102 from third flash drum 95 to the low pressure in demethanizer distillation column 12 in this embodiment of the system. That pressure is mentioned earlier. The condensate at this reduced pressure is passed from reducer 105 by a line 130 to the top inlet tray 13 of the assembly of trays 13 in the rectifying section of column 12. The bottom outlet tray 13 of that assembly is connected to a line 131 that introduces this condensate as a feed to column 12 at an elevation below that assembly and above the intermediate assembly of trays 13 mentioned earlier as an assembly through which passes condensate from second flash drum 91 by line 101, pressure reducer 104 and line 125.

The bottoms from demethanizer distillation column 12 are removed by a line 132. These bottoms constitute primarily ethane and ethylene.

The overhead from demethanizer distillation column 12 is removed by a line 133. The overhead is primarily methane. It will contain a small amount of hydrogen and a small amount of ethylene. From line 133 that overhead gas passes seriatim through third heat exchanger 77, a line 134, second heat exchanger 70, a line 135, and first heat exchanger 75 to an exit line 136.

In an ethylene plant one product may be a gas that is a mixture of methane and hydrogen. It is designed to recover from this mixture a substantial amount of the hydrogen in the form of high-purity (95%) hydrogen. For this purpose another embodiment of the system of the invention includes an assembly of the heat-exchanger trays mounted in a knock-back tower. The feed to the tower is first passed through a heat exchanger to lower its temperature sufficiently so that in the tower there will be a substantial separation of hydrogen as overhead. Through cold boxes of the heat exchanger are separately passed the overhead high-purity hydrogen from the tower and the methane concentrate bottoms from the tower. The bottoms from the tower are passed after a pressure reduction and a passage through the assembly of trays 13 located in the tower above the place of introduction of feed to the tower. The inlet tray is the top tray of the assembly and the bottom tray is the outlet of the assembly. From that outlet tray the methane concentrate passes through its cold boxes in the heat exchanger. The flow of high-purity hydrogen and the flow of methane concentrate bottoms through the heat exchanger is countercurrent to the flow of feed that then passes to the tower.

The heat-exchanger tray of the preferred embodiments of the invention described above has sets of horizontal parallel pipes and at opposite margins of the tray there are manifolds connected to the ends of these pipes. In light of the description of distillation trays on pages 39–55 of my book mentioned above, a conventional distillation tray is primarily a horizontal plate. In its broadest aspect the heat-exchanger tray of the invention can be considered as a pair of vertically spaced plates to provide a chamber extending to opposite margins constructed as manifolds. These plates have aligned openings for vertical passage of vapor. In the Turbogrid tray of the prior art these openings are slots that extend across the intermediate portion between opposite margins. For each heat-exchanger tray of the preferred embodiments of the invention, the margins are hollow to function as manifolds and spaced tubes are used to provide these slots and, at the same time, the chamber extending between the opposite margins of the tray of the invention is, by virtue of the use of pipes, separated into a number of parallel chambers in the intermediate portion of the tray. In these preferred embodiments the intermediate portion of the tray could be viewed as a pair of corrugated plates having aligned longitudinal slots at their junctures where they are joined to form that number of chambers communicating the opposited hollow margins of the tray with each other. The walls of the tubes at an intermediate level provide those walls at the spaces between the pipes to complete the construction of the walls for chambers extending between the opposite margins of the tray that are hollow to function as manifolds.

The foregoing detailed description of embodiments of heat exchanger tray, the assembly of these trays, a column containing one or more of these assemblies and the system of the present invention have been presented only for purpose of illustration of these aspects of the invention. The present invention is limited only by the claims that follow.

I claim:
1. A heat-exchanger tray for a distillation column, said heat-exchanger tray being hollow and constructed:
   to provide a pair of horizontal manifolds at opposite margins;
   to provide within the portion of said tray between said manifolds a number of walls to form a number of spaced chambers communicating said pair of manifolds with each other; and
   to have vertical openings in said tray between those of said walls that provide adjacent chambers of said chambers,
said walls between adjacent chambers being spaced from each other so that said vertical openings between said spaced walls is such that when said tray is installed and used as a distillation tray in a distillation column a pool of down-flowing liquid is formed above the entire area of said portion of said tray between said pair of manifolds and that pool of liquid is supported on that portion of said tray primarily by said walls forming said chambers while up-flowing vapor can pass through said openings, and each of said manifolds having an opening for passage of fluid to or from said tray so that fluid can pass from one of said manifolds through said chambers in said portion of said tray between said pair of manifolds to the other of said manifolds with indirect heat exchange of the up-flowing vapor and pool of down- flowing liquid with the fluid flowing through these chambers.

2. An assembly of the heat-exchanger trays of claim 1 in which said trays are arranged in a vertically tiered array spaced from one another with one manifold of each tray being at a vertical plane and the other of each pair of manifolds of the trays being at another vertical plane, said assembly further including a number of vertical conduit means each connected to opposed vertical openings of two adjacent manifolds in the same plane in an alternating manner so that flow of fluid passes through one tray in one direction between its manifolds and passes in the opposite direction through adjacent trays.

3. A heat-exchanger tray for a distillation column comprising:
  a set of parallel horizontal pipes spaced from one another;
  a first manifold connected to one end of each of said set of pipes and having:
    a horizontal set of openings to provide communication between said first manifold and said one end of said set of pipes; and
    another opening for passage of fluid into said first manifold for passage through said set of pipes from said first manifold; and
  a second manifold connected to the other end of each of said set of pipes and having:
    a horizontal set of openings to provide communication between said second manifold and said other end of said set of pipes; and
    another opening for passage of fluid out of said second manifold received from said set of pipes at said other end of said pipes,
  said spaced parallel horizontal pipes of said set thereby being located at a portion of said tray between said first and second manifolds and being spaced from each other so that the spacing between adjacent pipes is such that when said tray is installed and used as a distillation tray in a distillation column a pool of down-flowing liquid is formed above the entire area of said portion of said tray between said first and second manifolds and that pool of liquid is supported primarily on that portion of said tray by said pipes while up-flowing vapor can pass through said spaces between said adjacent pipes.

4. The heat-exchanger tray of claim 3 wherein:
  said first and second manifolds are pipes;
  said another opening in said first manifold pipe and said another opening in said second manifold pipe are located at an intermediate position of the length of said manifold pipes; and
  one of said another opening in one of said first and second manifold pipes faces in a vertical direction.

5. The heat-exchanger tray of claim 4 wherein said another openings of said first and second manifold pipes face vertically in opposite directions.

6. The heat-exchanger tray of claim 5 wherein the spacing between adjacent pipes of said set of pipes is such that the tray can function as a cross-flow type of tray in a distillation column.

7. The heat-exchanger tray of claim 6 wherein said another openings in said first and second manifold pipes are centrally located and further including a vertical tube mounted on said manifold pipe having said another opening facing upwardly and communicating with that manifold pipe through its said central another opening.

8. The heat-exchanger tray of claim 3 wherein said first and second manifolds are constructed to have vertical extensions in opposite directions, said extension of each manifold having a horizontal set of openings facing in the same direction as said set of horizontal openings providing communication between that manifold and said set of pipes.

9. The heat-exchanger tray of claim 3 in which:
  there are two groups of at least two of said set of parallel horizontal pipes at different levels;
  each of said first and second manifolds has at least two vertically spaced horizontal sets of openings at which one group of said sets of pipes are connected to said manifolds to provide communication between said manifolds and that group of sets of pipes;
  said manifolds have vertical extensions in opposite directions with each extension having at least two vertically spaced horizontal sets of openings facing the vertical plane passing through the other manifold; and
  one of these extensions of said manifolds being connected to one end of the other group of said sets of pipes to communicate that manifold also with that other group of sets of pipes,
  whereby fluid can pass through one group of sets of pipes in one direction and can pass through the other group of sets of pipes in the opposite direction.

10. The heat-exchanger tray of claim 9 wherein the pipes of each set of pipes at each level are staggered with respect to the pipes of the sets of pipes at adjacent levels and the spacing between pipes in each set are such that when the tray is installed in the chamber of a distillation column liquid in the chamber flows generally downward between the pipes of the set and between different levels of the sets countercurrent to upward flow of vapor in a manner generally obtained by conventional shower-type trays.

11. An assembly of the heat-exchanger trays of claim 3 in which:
  said trays are arranged in a vertically tiered array with the set of parallel horizontal pipes of each tray spaced from and extending parallel to the set of parallel horizontal pipes of each adjacent tray;
  the first manifold of each tray is at a vertical plane passing through the second manifold of each adjacent tray, said vertical plane being transverse to the longitudinal axes of the pipes of said sets of parallel horizontal pipes of said trays; and
  the second manifold of said each tray being at a vertical plane passing through the first manifold of each adjacent tray, said vertical plane being transverse to the longitudinal axes of the pipes of said sets of parallel horizontal pipes of said trays, and
  said assembly further including:
    conduit means communicating the first manifold of each intermediate tray at its another opening with the second manifold of an adjacent intermediate tray at its another opening;
    conduit means communicating the second manifold of the uppermost intermediate tray at its another opening with the first manifold of the uppermost tray of the assembly at its another opening; and
    conduit means communicating the first manifold of the lowermost intermediate tray at its another opening with the second manifold of the lowermost tray of the assembly at its another opening, whereby fluid passing through said assembly flows through each set of said sets of pipes in a direction opposite to the adjacent set of said sets of pipes.

12. The assembly of heat-exchanger trays of claim 11 wherein:
said manifolds are pipes;
each of said conduit means are tubes; and
said other openings of said manifold pipes to which they are connected are at an intermediate position of the length of their manifold pipes.

13. The assembly of heat-exchanger trays of claim 12 wherein:
said another openings in said manifold pipes communicating adjacent trays through said tubes are centrally located in their respective pipes;
said tubes are vertical tubes;
said spacing between adjacent pipes of each of said set of pipes of said trays is such that the tray can function as a cross-flow type of tray when the assembly is mounted in a distillation column; and
said another opening in said first manifold pipe of the lowermost tray of said assembly of trays faces away from that tray in a direction to communicate that manifold pipe with a pipe extending through the wall of the distillation column for communication between that manifold pipe and a location exterior of the column when the assembly is installed in the column.

14. The assembly of heat-exchanger trays of claim 13 wherein said another opening in said second manifold pipe of the uppermost tray of said assembly of trays faces away from that tray in a direction to communicate that manifold pipe with a pipe extending through the wall of the distillation column for communication between that manifold pipe and a location exterior of the column when the assembly is installed in the column.

15. The assembly of heat-exchanger trays of claim 14 wherein said another opening in said first manifold pipe of the lowermost tray and said another opening in said second manifold pipe of the uppermost tray of said assembly of trays face away from those trays in a horizontal direction.

16. The assembly of heat-exchanger trays of claim 11 wherein:
each tray has a group of at least two of said sets of parallel horizontal pipes at different levels;
said first and second manifolds, that are in a vertically tiered arrangement in each vertical plane transverse to the longitudinal axes of said sets of pipes of said trays, are constructed in a manner to provide a number of vertically tiered chambers so that, except for the first manifold of the lowermost tray and the second manifold of the uppermost tray, each chamber provides in its upper portion a first manifold for one tray and in its lower portion the second manifold of the adjacent lower tray;
each chamber having said upper and lower portions includes a wall having in its upper portion a group of at least two horizontal sets of openings at which one end of a group of said sets of pipes of said one tray are connected to that wall and having in its lower portion at least two horizontal sets of openings at which one end of the group of said sets of pipes of said adjacent lower tray are connected to that wall;
said chamber providing said first manifold of said lowermost tray includes a wall having at least two horizontal sets of openings to provide communication between said manifold and an end of the group of said sets of pipes of said lowermost tray; and
each chamber providing said second manifold of said uppermost tray having at least two horizontal sets of openings to provide communication between said manifold and an end of the group of said sets of pipes of said uppermost tray.

17. The assembly of heat-exchanger trays of claim 16 wherein the pipes of each set of pipes are staggered with respect to pipes of an adjacent set of the same group and the pipes of the lowermost and uppermost sets of pipes of each group are staggered with respect to the pipes of the adjacent set of another group and the spacing between pipes in each set is such that, when the assembly is installed in the chamber of a distillation column, liquid in the chamber flows generally downward between the pipes of each set, between pipes of adjacent sets of pipes and between adjacent pipes of adjacent sets of pipes of adjacent groups countercurrent to upward flow of vapor in a manner generally obtained by conventional shower-type trays.

18. The assembly of heat-exchanger trays of claim 17 having:
a first pair of vertical opposed plates parallel to said sets of pipes and extending the height of the assembly;
a second pair of vertical opposed plates normal to said first pair of vertical opposed plates, extending the height of the assembly, and connected to said first pair of plates at their vertical ends to provide by said pairs of plates a vertical chamber that is rectangular in horizontal cross section;
a third pair of vertical opposed plates between and spaced from said second pair of vertical opposed plates, said third pair of plates having said horizontal sets of openings for said chambers of said manifolds to which the ends of said groups of sets of parallel horizontal pipes are connected;
a first set of narrow horizontal plates between and connected to one plate each of said second and third pairs of plates to provide a set of said manifolds that are in a spaced tiered arrangement and that are communicating with one end of said sets of pipes; and
a second set of narrow horizontal plates between and connected to the other plates of said second and third pairs of plates to provide the other set of manifolds that are in a spaced tiered arrangement ant that are communicating with the other end of said sets of pipes, said second set of narrow plates being located at levels that are different from the levels of location of said first set of narrow plates so that the tiered manifolds provided by the second set of narrow plates is vertically staggered with respect to the tiered manifolds provided by said first set of narrow plates.

19. A distillation column containing:
a vertical vessel;
the assembly of heat-exchanger trays of claim 11 within a section of the vessel; and
inlet conduit means extending through the wall of said vessel and connected to that manifold of one outermost tray of said assembly other than the manifold connected to said conduit means communicating that tray with an adjacent intermediate tray.

20. The distillation column of claim 19 wherein said assembly is located in the stripping section of the column and the other outermost tray of said assembly is open to the chamber of said vessel so that fluid passing through said inlet conduit means and then through said assembly passes directly into the chamber of said vessel.

21. The distillation column of claim 20 wherein:
said manifolds are pipes;
each of said conduit means connecting said manifolds are tubes; and
said other openings of said manifold pipes to which said tubes are connected are at a central position of the length of their manifold pipes.

22. The distillation column of claim 20 and further including:
a second said assembly of heat-exchanger trays located within the rectifying section of the column;
inlet conduit means extending through the wall of said vessel and connected to that manifold of the uppermost tray of said second assembly other than the manifold connected to said conduit means communicating that tray with the adjacent intermediate tray; and
outlet conduit means extending through the wall of said vessel and connected to that manifold of the lowermost tray of said second assembly other than the manifold connected to said conduit means communicating that tray with the adjacent intermediate tray.

23. The distillation column of claim 19 and further including outlet conduit means extending through the wall of said vessel and connected to that manifold of the other outermost tray of said assembly other than the manifold connected to said conduit means communicating that tray with the adjacent intermediate tray so that fluid introduced by said inlet conduit means to said assembly passes by said outlet means, after indirect heat exchange with fluid in the chamber, out of said vessel.

24. The distillation column of claim 23 wherein:
said assembly is located in the stripping section of the column;
said manifolds are pipes;
each of said conduit means connecting said manifolds are tubes; and
said other openings of said manifold pipes to which said tubes are connected are at a central position of the length of their manifold pipes.

25. The distillation column of claim 24 and further including:
a second said assembly of heat-exchanger trays located within the rectifying section of the column;
inlet conduit means extending through the wall of said vessel and connected to that manifold of the uppermost tray of said second assembly other than the manifold connected to said conduit means communicating that tray with the adjacent intermediate tray; and
outlet conduit means extending through the wall of said vessel and connected to that manifold of the lowermost tray of said second assembly other than the manifold connected to said conduit means communicating that tray with the adjacent intermediate tray.

26. The distillation column of claim 23 wherein:
said assembly is located in the rectifying section of the column;
said manifolds are pipes;
each of said conduit means connecting said manifolds are tubes; and
said other openings of said manifold pipes to which said tubes are connected are at a central position of the length of their manifold pipes.

27. The distillation column of claim 20 wherein:
said manifolds are pipes;
each of said conduit means connecting said manifolds are tubes;
the spacing between adjacent pipes of said set of pipes of each tray is such that the tray can function as a cross-flow type of tray; and
said vessel being cylindrical at the location of said assembly of heat-exchanger trays,
and further including:
a pair of plates for each tray mounted at opposite margins of each tray to close off the space between said manifold pipes and said portion of said wall of said column;
an inlet weir mounted on each tray and extending from one end of one manifold pipe to one end of the other manifold pipe, extending parallel to said set of pipes of that tray, and spaced from the adjacent pipe of that set;
an outlet weir for each tray mounted at the other end of both manifold pipes, extending parallel to said set of pipes, and spaced from the adjacent pipe of said set of pipes; and
a horizontal plate for each inlet weir closing the space between said inlet weir and the adjacent portion of said wall of said vessel.

28. A distillation column containing:
a vertical vessel;
the assembly of heat-exchanger trays of claim 16 within a section of said vessel; and
inlet conduit means extending through the wall of said vessel and connected to that manifold of the outermost tray of said assembly other than the manifold connected to said conduit means communicating that tray with an adjacent intermediate tray.

29. A distillation column containing:
a vertical vessel having a section that is rectangular in horizontal cross section;
the assembly of heat-exchanger trays of claim 18 located at that rectangular section of said vessel with the walls of said vessel at that section constituting said first and second pairs of vertical opposed plates of said assembly; and
inlet conduit means extending through one of said second pair of walls to communicate with the chamber providing either the first manifold of said lowermost tray or the chamber providing said second manifold of said uppermost tray.

* * * * *